(12) United States Patent
Lee

(10) Patent No.: US 9,557,869 B2
(45) Date of Patent: Jan. 31, 2017

(54) HIGH-ACCURACY SINGLE-LAYER CAPACITIVE TOUCH PANEL DEVICE WITH ONE SIDE FOR CONNECTION

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 55 days.

(21) Appl. No.: 14/559,534

(22) Filed: Dec. 3, 2014

(65) Prior Publication Data
US 2015/0153879 A1 Jun. 4, 2015

(30) Foreign Application Priority Data
Dec. 4, 2013 (TW) .............................. 102222763 U

(51) Int. Cl.
*G06F 3/044* (2006.01)
(52) U.S. Cl.
CPC ..................... *G06F 3/044* (2013.01)
(58) Field of Classification Search
USPC ...................... 345/173–178; 178/18.01–20.01
See application file for complete search history.

(56) References Cited

U.S. PATENT DOCUMENTS

| | | | | |
|---|---|---|---|---|
| 2007/0247443 A1* | 10/2007 | Philipp | .................... | G06F 3/044 345/173 |
| 2011/0095990 A1* | 4/2011 | Philipp | .................... | G06F 3/044 345/173 |
| 2013/0154997 A1* | 6/2013 | Lin | ........................ | G06F 3/0416 345/174 |
| 2013/0162565 A1* | 6/2013 | Kim | ........................ | G06F 3/041 345/173 |
| 2015/0092121 A1* | 4/2015 | Tseng | ...................... | G06F 3/044 349/12 |

\* cited by examiner

*Primary Examiner* — Chad Dicke
(74) *Attorney, Agent, or Firm* — Muncy, Geissler, Olds & Lowe, P.C.

(57) ABSTRACT

A high-accuracy single-layer capacitive touch panel device with one side for connection includes a substrate, a plurality of conductive lines, and a touch detection circuit. The conductive lines are arranged in parallel on the surface of the substrate and extended from the first side to the second side of the substrate. Each conductive line includes a conductive trace having opposite first edge and second edge and a plurality of triangle sensing electrodes arranged at the two edges of the conductive trace. Each triangle sensing electrode is connected with the conductive trace via a connection part. Each conductive line only has one connection end close to the second side. A touch detection circuit is electrically connected to the connection ends of the plurality of conductive lines through a connection circuit, so as to detect variations of the equivalent resistances and the equivalent capacitances of the plurality of conductive lines.

6 Claims, 8 Drawing Sheets

HIGH-ACCURACY SINGLE-LAYER CAPACITIVE TOUCH PANEL DEVICE WITH ONE SIDE FOR CONNECTION

CROSS REFERENCE TO RELATED APPLICATION

This application claims the benefits of the Taiwan Patent Application Serial Number 102222763, filed on Dec. 4, 2013, the subject matter of which is incorporated herein by reference.

BACKGROUND OF THE INVENTION

1. Field of the Invention

The present invention relates to a touch panel structure and, more particularly, to a high-accuracy single-layer capacitive touch panel device with one side for connection.

2. Description of Related Art

Currently, capacitive touch panels are in widespread use, and are primarily applied in consumer electronic apparatuses, such as PDA, palmtop computer, electronic dictionary, mobile phone, web pad, electronic book, tablet PC, digital camera, self-ordering system, stocktaking machine, POS cash register, credit card POS signature machine, and medical monitoring system.

On the other hand, a resistive touch panel is formed by overlapping an upper ITO (Indium Tin Oxide) conductive layer and a lower ITO conductive layer. The pressure applied to the touch panel will cause the electrodes of the upper layer to conduct with the electrodes of the lower layer. A controller calculates the position of the touch point by detecting the voltage variation of the touch panel. When a user touches a certain point on the screen, a current is caused due to the conduction so as to generate an operation, and a processor calculates the position of the operated point, while a driver translates such an operation into the language that the system can understand.

For the single-layer capacitive touch panel device, it is arranged to connect the two sides of the conductive layer to a detection circuit for measuring the current and voltage variations on the conductive layer. Such skills can be found in, for example, U.S. Pat. No. 6,961,049 granted to Mulligan, et al. for a "Capacitive touch sensor architecture with unique sensor bar addressing", and U.S. Pat. No. 7,735,383 granted to Dattalo, et al. for a "Balanced resistance capacitive sensing apparatus". However, this arrangement needs to dispose the connection wires at two sides of the substrate, resulting in negatively influencing the overall appearance of the touch panel, badly affecting the product design, and erroneously determining the touched point due to the connection wires at the sides.

To solve the aforementioned problem, one solution is to dispose the connection wires at one side of the substrate. FIG. 1 is a schematic diagram of a prior single-layer capacitive touch panel device with one side for connection and its touch detection circuit. As shown in FIG. 1, the prior single-layer capacitive touch panel device 1 includes a substrate 10, a plurality of conductive lines 101-110, and a touch detection circuit 11. Each of the plurality of conductive lines 101-110 is of a bar shape and arranged on the surface of substrate 10 in parallel with each other, and is electrically connected to the touch detection circuit 11 through a connection wire 19. The plurality of conductive lines 101-110 are extended from the first side 10a to the second side 10b of the substrate 10. Each conductive line 101-110 has a connection part 101b-110b close to the second side 10b. The touch detection circuit 11 is electrically connected to the connection part 101b-110b of the conductive lines 101-110 through the connection wires 19, so as to detect the variations of electrical characteristic of the plurality of conductive lines 101-110, thereby determining at least one touch point A on the substrate 10.

The touch point detection of FIG. 1 is performed by detecting the capacitance variations of the plurality of conductive lines 101-110 to determine the Y-direction coordinate of the touch point A (e.g., the conductive line 108), and then detecting the resistance variation of the conductive line 108, so as to determine the X-direction coordinate of the touch point A. Such a detection method encounters a dilemma. When the width of the conductive line 101-110 in increased, the spacing between two conductive lines 101-110 is decreased to facilitate in detecting the capacitance variations of the plurality of conductive lines 101-110. However, because the width of the conductive line 101110 is increased, the resistance of each of the conductive lines 101-110 becomes smaller, resulting in a difficulty in detecting the resistance variations of the conductive lines. When the width of the conductive line 101-110 is decreased, the resistance of each conductive line 101-110 is increased to facilitate in detecting the resistance variations of the conductive lines, but the spacing between two conductive lines 101-110 is increased and thus the capacitance thereof becomes smaller, which is disadvantageous in detecting the capacitance variations of the conductive lines 101-110.

Therefore, it desired for the aforementioned single-layer capacitive touch panel device structure to be improved.

SUMMARY OF THE INVENTION

The object of the present invention is to provide a high-accuracy single-layer capacitive touch panel device with one side for connection, in which connection wires are disposed at one only side, while the other three sides are designed to have a frameless structure, so as to simplify the arrangement of the touch panel and improve the accuracy of touch point detection.

To solve the problem, there is provided a high-accuracy single-layer capacitive touch panel device with one side for connection, which comprises: a substrate having a surface, a first side, and a second side opposite to the first side; a plurality of conductive lines, each having an equivalent resistance and an equivalent capacitance, the plurality of conductive lines being arranged in parallel on the surface of the substrate and extended from the first side to the second side of the substrate, each conductive line including a conductive trace having a first edge and a second edge opposite to the first edge and a plurality of triangle sensing electrodes arranged at the two edges of the conductive trace, each triangle sensing electrode being connected with the conductive trace via a connection part, each conductive line only having one connection end close to the second side; and a touch detection circuit electrically connected to the connection ends of the plurality of conductive lines through a connection circuit, so as to detect variations of the equivalent resistances and the equivalent capacitances of the plurality of conductive lines, thereby determining at least one touch position on the substrate.

DETAILED DESCRIPTION OF THE PREFERRED EMBODIMENT

Figure 1:
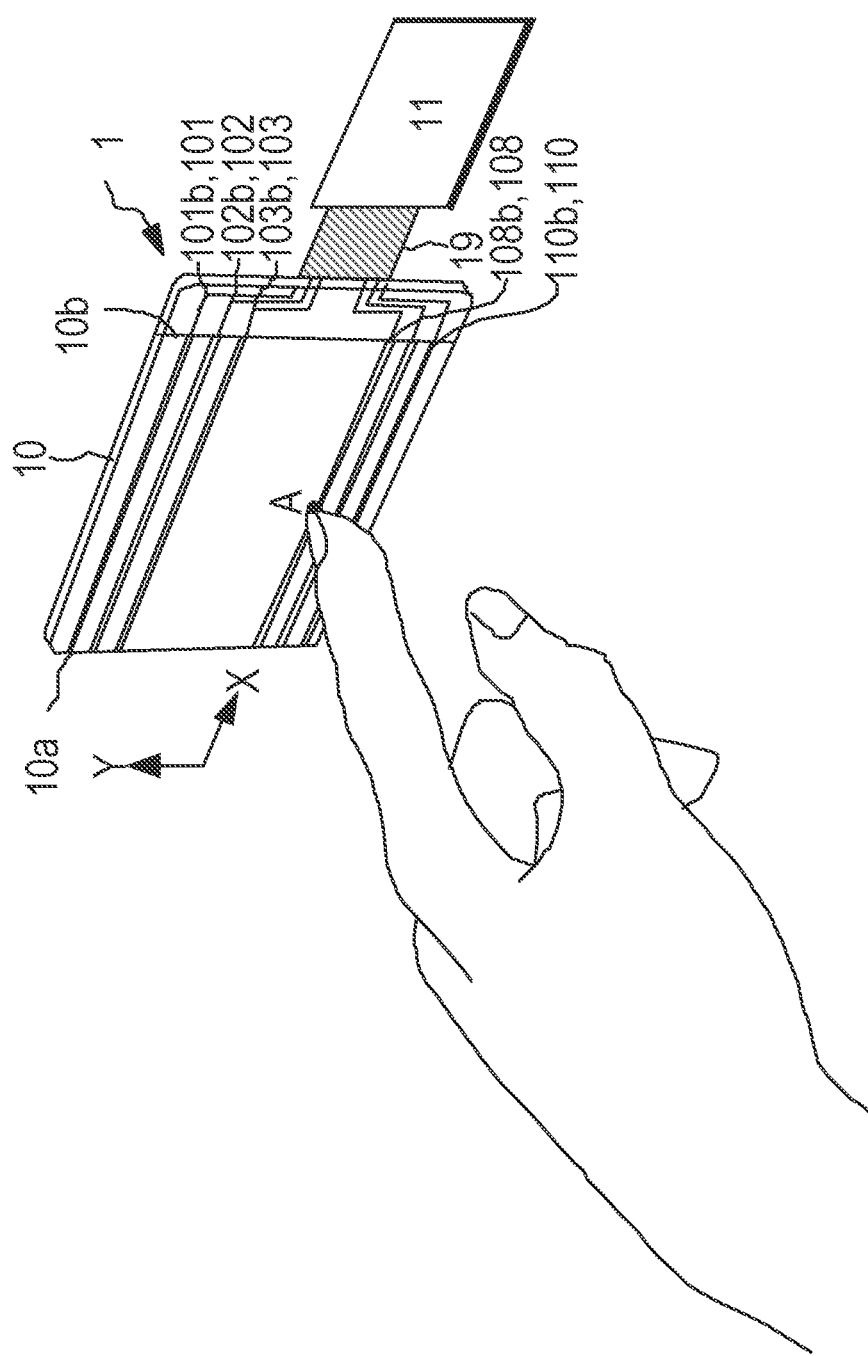
FIG. 1 is a schematic diagram of a prior single-layer capacitive touch panel device with one side for connection and its touch detection circuit.
Figure 2:
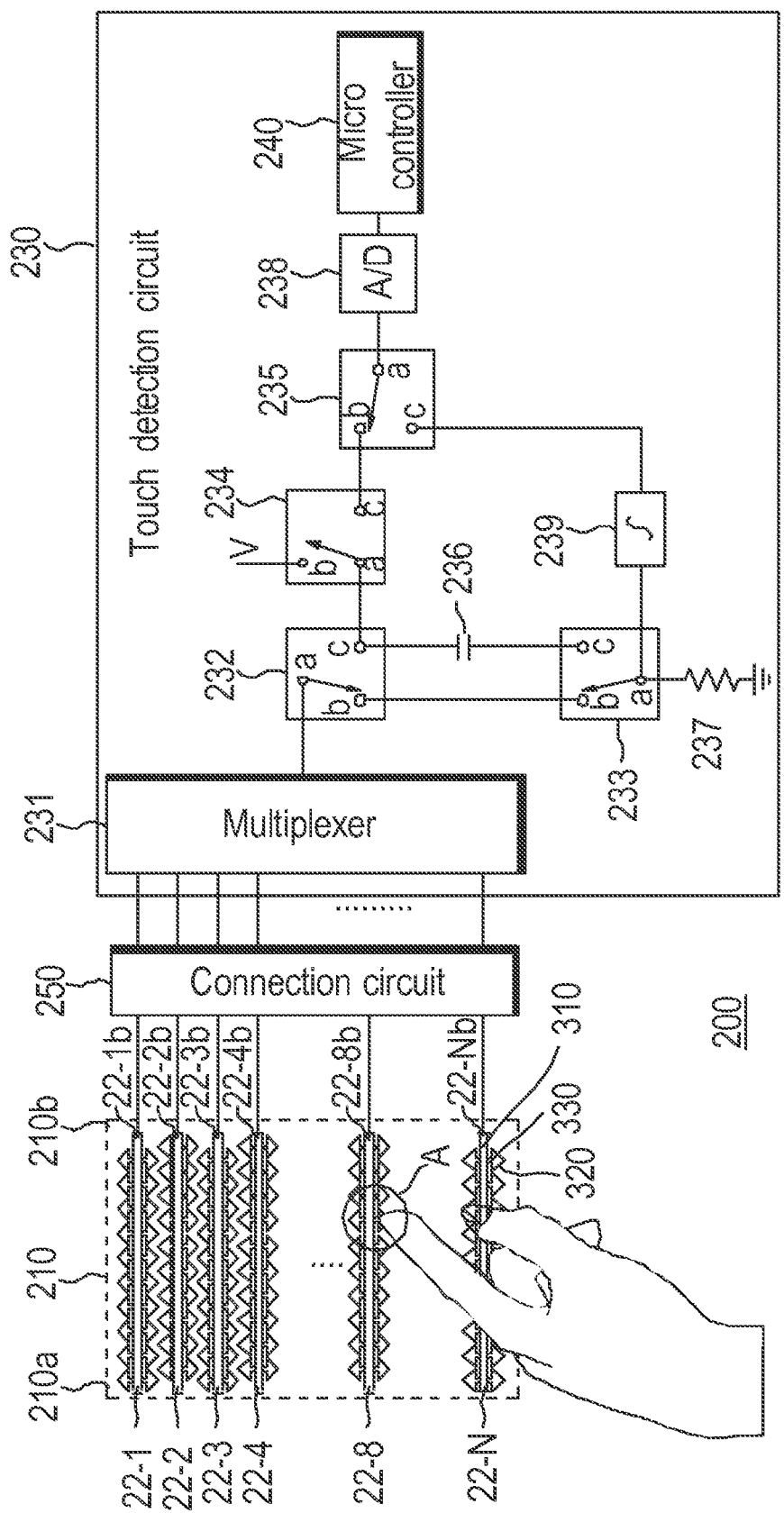
FIG. 2 is a schematic diagram of a high-accuracy single-layer capacitive touch panel device with one side for connection in accordance with a first embodiment of the present invention.

FIG. 2 is a schematic diagram of a high-accuracy single-layer capacitive touch panel device with one side for connection 200 in accordance with the present invention, which includes a substrate 210, a plurality of conductive lines 22-1 to 22-N, and a touch detection circuit 230. The substrate 210 includes a surface, a first side 210a, and a second side 210b opposite to the first side 210a. The plurality of conductive lines 22-1 to 22-N each has an equivalent resistance and an equivalent capacitance. The plurality of conductive lines 22-1 to 22-N are arranged in parallel on the surface of substrate 210, and extended from the first side 210a to the second side 210b of the substrate 210. For the convenience of description, there are, for example, N conductive lines 22-1 to 22-N in this embodiment, where N is an integer greater than 1.

Figure 3:
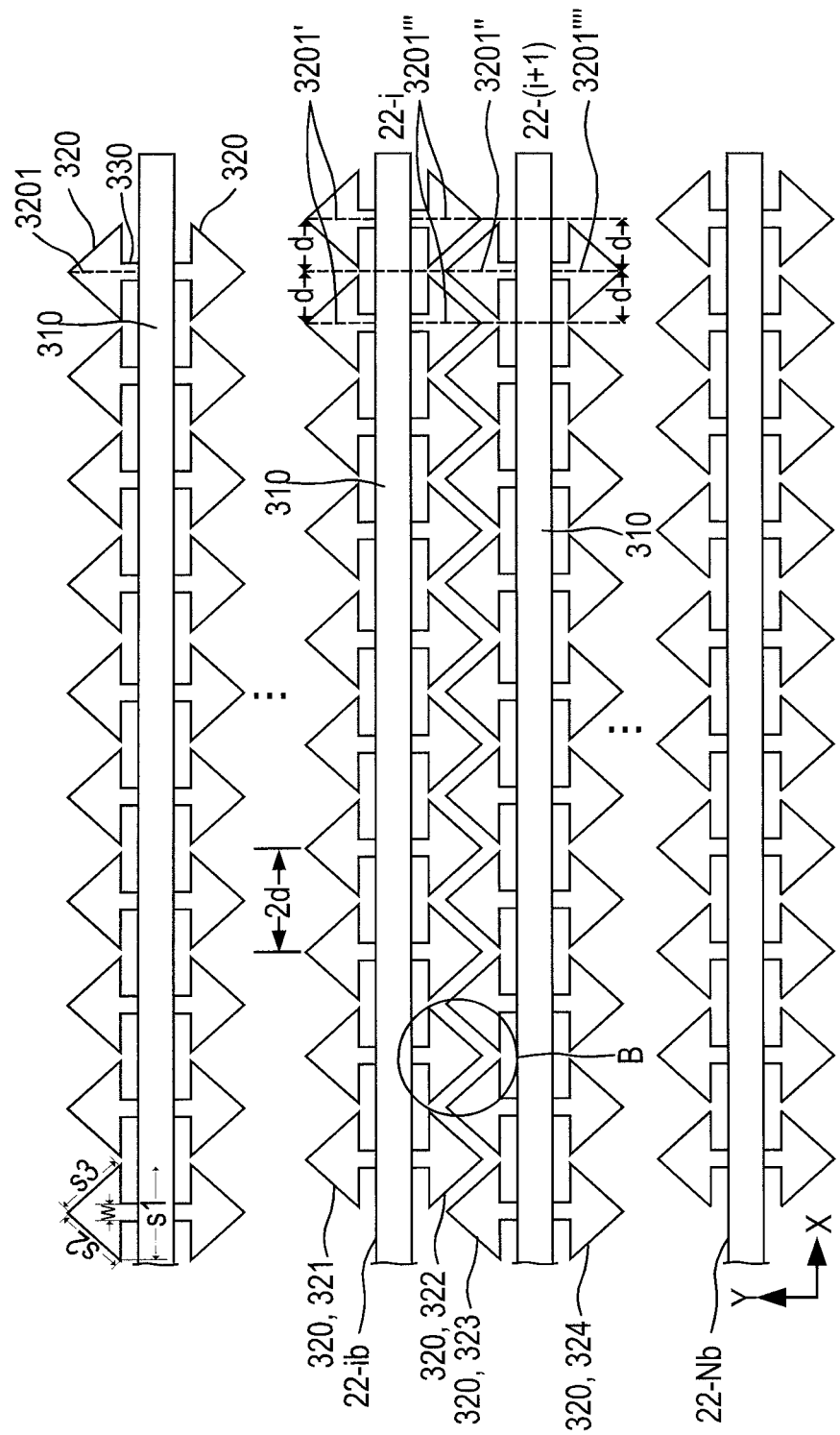
FIG. 3 is a schematic diagram of the conductive lines in accordance with the present invention.

FIG. 3 is a schematic diagram of the conductive lines 22-1 to 22-N in accordance with the present invention. Each conductive line has a conductive trace 310. The conductive trace 310 has a first edge and a second edge opposite to the first edge, each edge being arranged with a plurality of triangle sensing electrodes 320. Each triangle sensing electrode 320 has a symmetry axis 3201 and is connected with the conductive trace 310 via a connection part 330, wherein the connection part 330 is extended along the symmetry axis 3201 of the triangle sensing electrode 320 and has a width (w) smaller than any of side lengths (s1, s2, s3) of the triangle sensing electrode 320. Each conductive line 22-1 to 22-N only has one connection end 22-1b to 22-Nb close to the second side 210b. The touch detection circuit 230 is electrically connected to the connection ends 22-1 to 22-Nb of the plurality of conductive lines 22-1 to 22-N through a connection circuit 250, so as to detect the variations of the equivalent resistances and the equivalent capacitances of the plurality of conductive lines 22-1 to 22-N, thereby determining at least one touch position on the substrate 210. Preferably, the conductive lines 22-1 to 22-N are made of ITO (Indium Tin Oxide) material, and the connection circuit 250 is a flexible printed circuit (FPC).

As shown in FIG. 3, each triangle sensing electrode 320 is symmetric about its symmetry axis 3201. The plurality of triangle sensing electrodes 321 at the first edge of the conductive trace 310 of the i-th conductive line 22-i are disposed at positions aligned with the positions of the plurality of triangle sensing electrodes 322 at the second edge thereof, respectively, and the symmetry axes 3201' of two adjacent triangle sensing electrodes 321 at the first edge thereof are arranged to have a first distance (2d) therebetween, where i is a positive integer. The symmetry axis 3201' of one of the plurality of triangle sensing electrodes 321 at the first edge of the conductive trace 310 of the i-th conductive line 22-i is arranged at a position to have a second distance (d) to the symmetry axis 3201'' of the nearest one of the plurality of triangle sensing electrodes 323 at the first edge of the conductive trace 310 of the (i+1)-th conductive line 22-(i+1). The first distance (2d) is twice of the second distance (d). The symmetry axis 3201''' of one of the plurality of triangle sensing electrodes 322 at the second edge of the conductive trace 310 of the i-th conductive line 22-i is arranged at a position to have a second distance (d) to the summetry axis 3201'''' of the nearest one of the plurality of triangle sensing electrodes 324 at the second edge of the conductive trace 310 of the (i+1)-th conductive line 22-(i+1).

Figure 4:
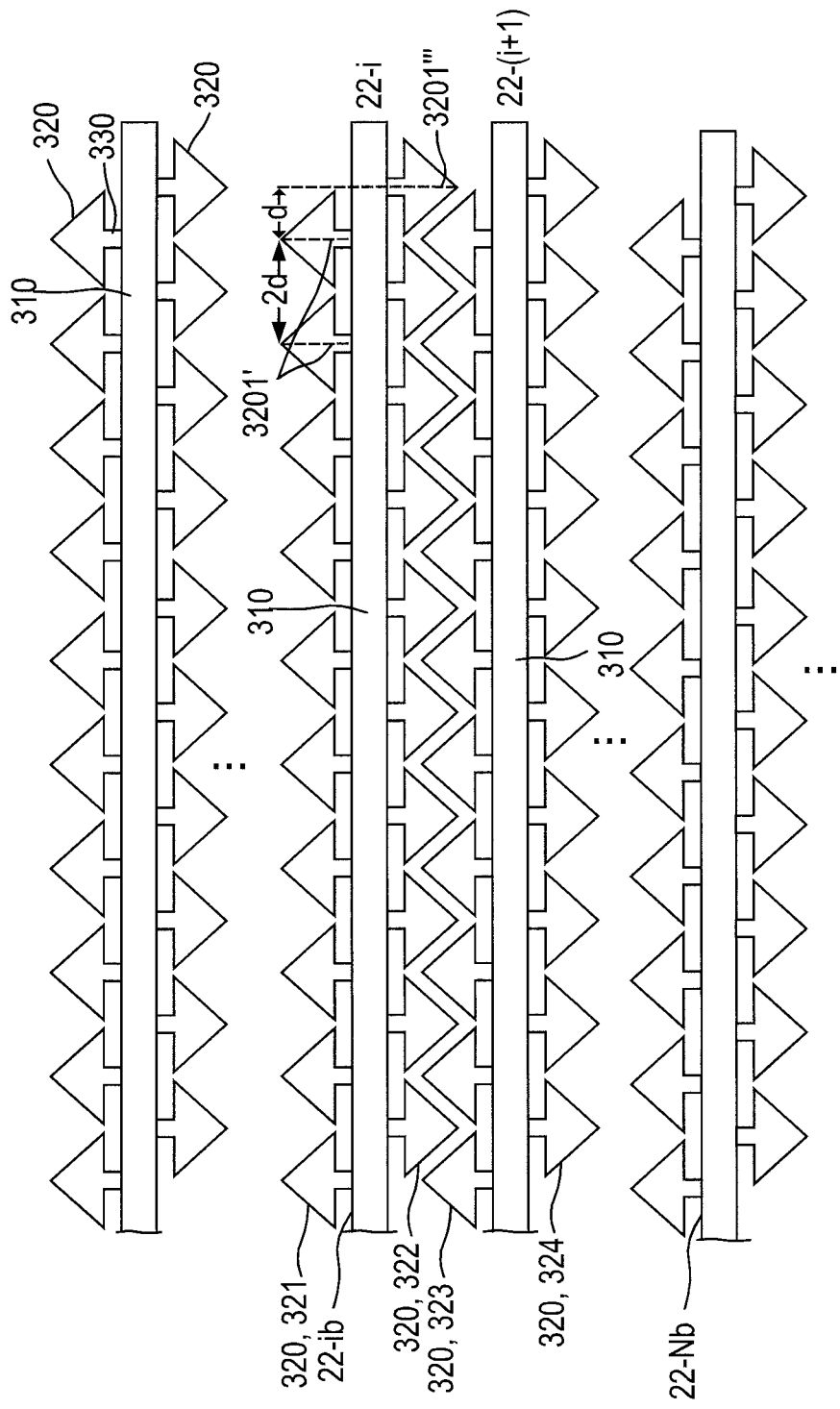
FIG. 4 is another schematic diagram of the conductive lines in accordance with the present invention.

FIG. 4 is another schematic diagram of the conductive line 22-1 to 22-N in accordance with the present invention. As shown, the symmetry axis 3201' of one of the plurality of triangle sensing electrodes 321 at the first edge of the conductive trace 310 of the i-th conductive line 22-i is arranged at a position to have a third distance (d) to the symmetry axis 3201''' of the nearest one of the plurality of triangle sensing electrodes 322 at the second edge thereof, and the symmetry axes 3201' of two adjacent triangle sensing electrodes 321 at the first edge are arranged to have a fourth distance (2d) therebetween, wherein the fourth distance (2d) is twice of the third distance (d). The plurality of triangle sensing electrodes 321 at the first edge of the conductive trace 310 of the i-th conductive line 22-i are disposed at positions aligned with the positions of the plurality of triangle sensing electrodes 323 at the first edge of the conductive trace 310 of the (i+1)-th conductive line 22-(i+1), respectively. The plurality of triangle sensing electrodes 322 at the second edge of the conductive trace 310 of the i-th conductive line 22-i are disposed at positions aligned with the positions of the plurality of triangle sensing electrodes 324 at the second edge of the conductive trace 310 of the (i+1)-th conductive line 22-(i+1), respectively.

Figure 5:
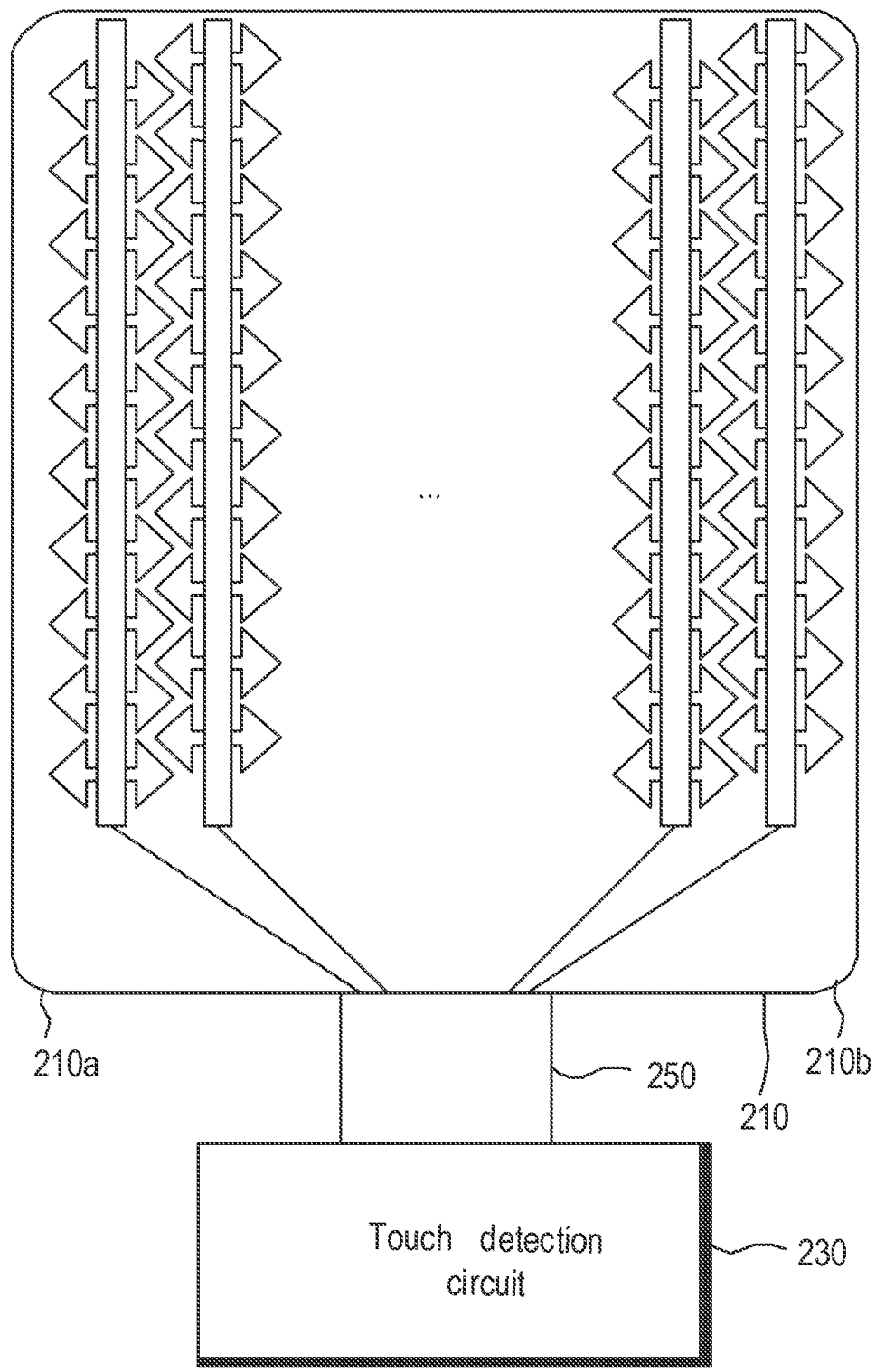
FIG. 5 is a schematic diagram of a high-accuracy single-layer capacitive touch panel device with one side for connection in accordance with a second embodiment of the present invention.
Figure 6:
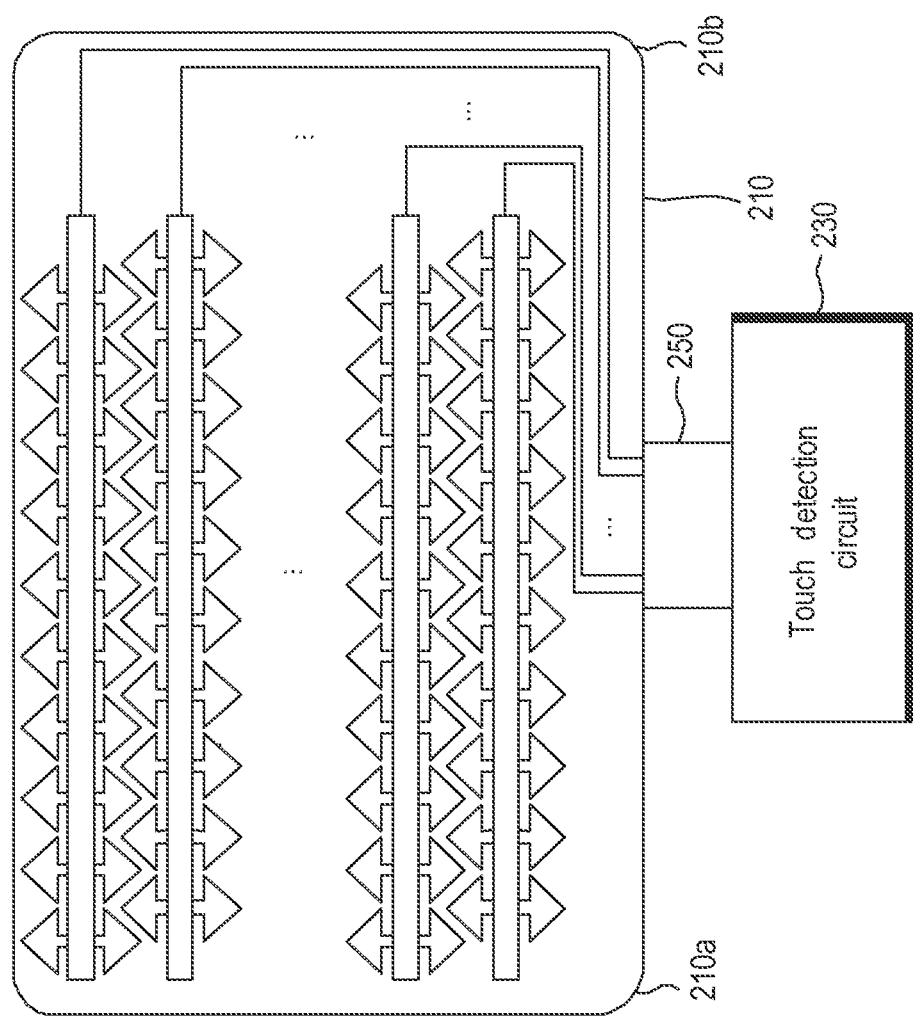
FIG. 6 is a schematic diagram of a high-accuracy single-layer capacitive touch panel device with one side for connection in accordance with a third embodiment of the present invention.

The touch panel device of the present invention is characterized in that: the conductive line 22-1 to 22-N are arranged is parallel and disposed on the surface of the substrate 210, and are connected with the connection circuit 250 and the touch detection circuit 230 through the connection ends 22-1b to 22-Nb at only side. In addition to the horizontal configuration as shown in FIG. 2, the present invention also can adopt a vertical configuration, as shown in FIG. 5. Alternatively, the present invention can adopt the horizontal configuration but the connection circuit 250 is disposed at the bottom for connection with the touch detection circuit 230, as shown in FIG. 6.

The substrate 210 of the present invention is preferably a rectangle structure, and has the first side 210a and the second side 210b opposite to the first side 210a. The plurality of conductive lines 22-1 to 22-N are extended from the first side 210a to the second side 210b of the substrate 210. Each conductive line 22-1 to 22-N has a connection end 22-1b to 22-Nb close to the second side 210b. The touch detection circuit 230 is electrically connected to the connection ends 22-1 to 22-Nb of the conductive lines 22-1 to 22-N through the connection circuit 250, so as to detect the variations of electrical characteristics of the plurality of conductive line 220 thereby determining at least one touch point A on the substrate 210.

On example of this embodiment is given to illustrate how to detect the touch point in the present invention. With reference to FIG. 2, there is shown the system architecture of a preferred embodiment in accordance with the present invention. As shown, the touch detection circuit 230 includes: a multiplexer 231, a first switch 232, a second switch 233, a third switch 234, a fourth switch 235, a capacitor 236, a resistor 237, an analog to digital converter 238, an integration circuit 239, and a micro controller 240.

The multiplexer 231 is electrically connected to the plurality of conductive lines 22-1 to 22-N through the connection circuit 250. The first switch 232 has a first terminal "a" connected to the multiplexer 231, a second terminal "b" connected to a second terminal "b" of the second switch 233, and a third terminal "c" connected to the capacitor 236. The second switch 233 has a first terminal "a" connected to the resistor 237 and the integration circuit 239, the second terminal "b" connected to the second terminal "b" of the first switch 232, and a third terminal "c" connected to the capacitor 236. The third switch 234 has a first terminal "a" connected to the capacitor 236 and the third terminal "c" of the first switch 232, a second terminal "b" connected to a DC power source V, and a third terminal "c" connected to a second terminal "b" of the fourth switch 235. The fourth switch 235 has a first terminal "a" connected to the analog to digital converter 238, the second terminal "b" connected to the third terminal "c" of the third switch 234, and a third terminal "c" connected to the integration circuit 239.

Figure 7:
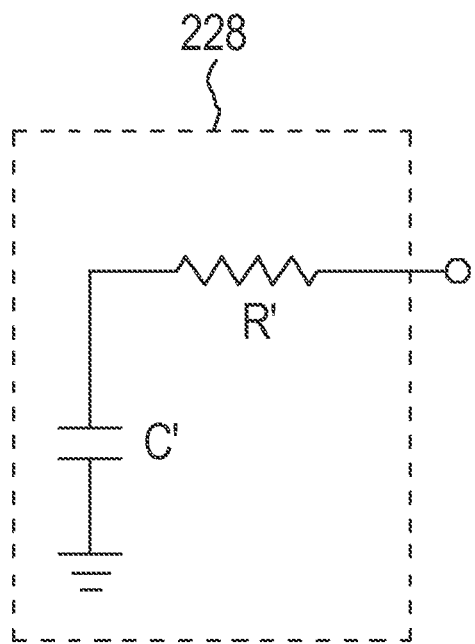
FIG. 7 is a first equivalent circuit in accordance with the present invention.

The resistor 237 has a resistance R, and the capacitor 236 has a capacitance C. Each of the plurality of conductive lines 22-1 to 22-N has an equivalent resistance and an equivalent capacitance. For the convenience of description, the conductive line 22-8 is taken as an example in this embodiment. When the finer of a user touches the touch point A of the conductive line 22-8, the equivalent resistance of the conductive line is R', and the equivalent capacitance thereof is C', as shown by the equivalent circuit in FIG. 7.

Figure 8:
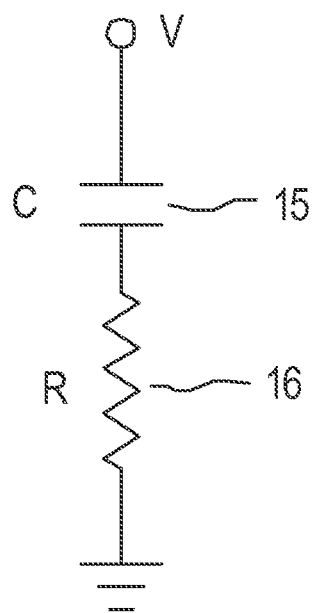
FIG. 8 is a second equivalent circuit in accordance with the present invention.

The multiplexer 231 sequentially selects one of the conductive lines 22-1 to 22-N, and thus each conductive line 22-1 to 22-N uses the same way to measure the equivalent resistance and the equivalent capacitance. When the multiplexer 231 selects the conductive line 22-8, the first terminal "a" of third switch 234 is switched to its second terminal "b" to connect the DC power source V to the capacitor 236, and the first terminal "a" of the second switch 233 is switched to its third terminal "c" to connect the capacitor 236 to the resistor 237. At this moment, the DC power source V charges the capacitor 236, and the equivalent circuit is shown in FIG. 8. After completion of the charging cycle, the first terminal "a" of the third switch 234 is switched to its third terminal "c", and the first terminal "a" of the fourth switch 235 is switched to its second terminal "b" so that the analog to digital converter 238 is electrically connected to the capacitor 236 for reading a voltage value V1 after charging and then the integration circuit 239 is reset to zero.

Figure 9:
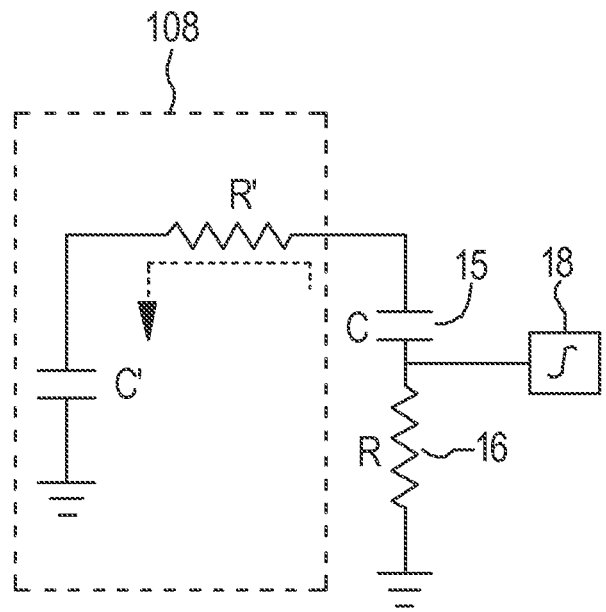
FIG. 9 is a third equivalent circuit in accordance with the present invention.

Subsequently, the first terminal "a" of the first switch 232 is switched to its third terminal "c". The first terminal "a" of the second switch 233 is switched to its third terminal "c" so that the capacitor 236 charges the conductive line 228, and the integration circuit 239 starts to accumulates a square value of the current flowing through the resistor 237, wherein the equivalent circuit therefor is shown in FIG. 9.

Figure 10:
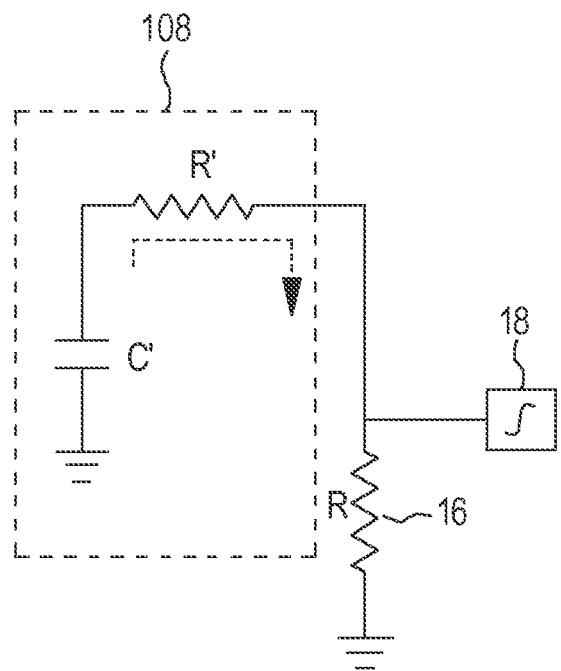
FIG. 10 is a fourth equivalent circuit in accordance with the present invention.

Then, the first switch 232 and the second switch 233 are operated at the same time. The first terminal "a" of the first switch 232 is switched to its second terminal "b" and the first terminal "a" of the second switch 233 is switched to its second terminal "b" so as to discharge the conductive line 228, as shown in the equivalent circuit of FIG. 10. The integration circuit 239 continues to accumulate the square value of the current flowing through the resistor 237.

The first switch 232 and the first switch 232 are again switched to the capacitor 236 several times so that the capacitor 236 charges the conductive line 228 and the conductive line 228 itself is discharged several times. The integration circuit 239 still continues to accumulate the square value of the current flowing through the resistor 237.

Finally, the integration circuit 239 stops recording the square value of the current flowing through the resistor 237, and the square value of the total current obtained is $I^2$. The first terminal "a" of the second switch 233 is switched to its third terminal "c", the first terminal "a" of the third switch 234 is switched to its third terminal "c", and the first terminal "a" of the fourth switch 235 is switched to its second terminal "b", so as to connect the analog to digital converter 238 to the capacitor 236 for reading the voltage value V2 of the capacitor 236 after discharging.

The analog to digital converter 238 transmits the first voltage value V1, the second voltage value V2 and the total current value I to the micro controller 240 for calculating the equivalent resistance R' and the equivalent capacitance C' of the conductive line 22-8 according to the law of conservation of energy. The calculation is based on the following formulas:

$$C' = C\left(\frac{V1-V2}{V2}\right),$$

and $$R' = \frac{1}{2}C\left(\frac{V1^2 - V2^2}{I^2}\right) - R.$$

Due to that the finger of a user touches the conductive line 228, the equivalent capacitance C' of the conductive line 22-8 is increased, and thus is obviously higher than those of the other conductive lines 22-1 to 22-N. By using the interpolation method, the coordinate of the vertical axis can be obtained, from which the micro controller 240 can determine that the touch point A is on the conductive line 22-8. Further, the equivalent resistance R' is positively proportional to the distance between the touch point A and the connection end 22-8b. Therefore, with the positive proportion, it is able to calculate the coordinate of horizontal axis of the touch point A on the conductive line 22-8. Accordingly, by reading the first voltage value V1, the second voltage value V2 and the current value I, the micro controller 240 can determine the plane coordinate of the touch point A on the substrate 210.

As shown by the circle B in FIG. 3, the area of the triangle sensing electrodes 322 of conductive trace 310 of the i-th conductive line 22-i and the triangle sensing electrodes 323 of conductive trace 310 of the (i+1)-th conductive line 22-(i+1) is effectively increased, which facilitates the touch detection circuit 230 to detect the capacitance variations of the plurality of conductive lines 22-1 to 22-N. Moreover, because the plurality of triangle sensing electrodes 320 are arranged on the two edges of the conductive trace 310, the conductive trace 310 of the conductive line can be made thin to increase the resistance value of the conductive trace 310 for allowing the touch detection circuit 230 to detect the resistance variation of the conductive trace 310. As a result, the accuracy of detecting the touch position in accordance with the present invention is higher than that of the prior art.

Although the present invention has been explained in relation to its preferred embodiment, it is to be understood that many other possible modifications and variations can be made without departing from the spirit and scope of the invention as hereinafter claimed.

What is claimed is:

1. A high-accuracy single-layer capacitive touch panel device with one side for connection, comprising:
    a substrate having a surface, a first side, and a second side opposite to the first side;
    a plurality of conductive lines, each having an equivalent resistance and an equivalent capacitance, the plurality of conductive lines being arranged in parallel on the surface of the substrate and extended from the first side to the second side of the substrate, each conductive line including a conductive trace having a first edge and a second edge opposite to the first edge, and a plurality of triangle sensing electrodes arranged at the two edges of the conductive trace, each triangle sensing electrode having a symmetry axis and being connected with the conductive trace via a connection part which is a conductor wire, wherein the conductive wire is extended along the symmetry axis of the triangle sensing electrode and has a width smaller than any of side lengths of the triangle sensing electrode, each conductive line only having one connection end close to the second side; and a touch detection circuit electrically connected to the connection ends of the plurality of conductive lines through a connection circuit, so as to detect variations of the equivalent resistances and the equivalent capacitances of the plurality of conductive lines, thereby determining at least one touch position on the substrate, wherein
    the plurality of triangle sensing electrodes at the first edge of the conductive trace of an i-th conductive line are disposed at positions aligned with those of the plurality of triangle sensing electrodes at the second edge thereof, respectively, and the symmetry axes of two adjacent triangle sensing electrodes at the first edge thereof are arranged to have a first distance therebetween, where i is a positive integer,
    the symmetry axis of one of the plurality of triangle sensing electrodes at the first edge of the conductive trace of the i-th conductive line is arranged at a position to have a second distance to the symmetry axis of a nearest one of the plurality of triangle sensing electrodes at the first edge of the conductive trace of the (i+1)-th conductive line, and the first distance is twice of the second distance, and the symmetry axis of one of the plurality of triangle sensing electrodes at the second edge of the conductive trace of the i-th conductive line is arranged at a position to have the second distance to the symmetry axis of a nearest one of the plurality of triangle sensing electrodes at the second edge of the conductive trace of the (i+1)-th conductive line.

2. The high-accuracy single-layer capacitive touch panel device with one side for connection as claimed in claim 1, wherein the touch detection circuit comprises:
    a multiplexer selector electrically connected to the plurality of conductive lines;
    a first switch electrically connected to the multiplexer;
    a resistor having a resistance value;
    a second switch electrically connected to the resistor and the first switch;
    a capacitor having a capacitance value, the capacitor being electrically connected to the first switch and the second switch;
    a third switch electrically connected to the capacitor;
    a analog to digital converter electrically connected to a microcontroller;
    a fourth switch electrically connected to the analog to digital converter and the third switch; and
    an integration circuit electrically connected to the second switch and the fourth switch.

3. The high-accuracy single-layer capacitive touch panel device with one side for connection as claimed in claim 2, wherein the plurality of conductive lines are made of indium tin oxide material.

4. The high-accuracy single-layer capacitive touch panel device with one side for connection as claimed in claim 1, wherein the substrate has a rectangle structure.

5. The high-accuracy single-layer capacitive touch panel device with one side for connection as claimed in claim 1, wherein the connection circuit is a flexible printed circuit.

6. A high-accuracy single-layer capacitive touch panel device with one side for connection, comprising:
    a substrate having a surface, a first side, and a second side opposite to the first side;
    a plurality of conductive lines, each having an equivalent resistance and an equivalent capacitance, the plurality of conductive lines being arranged in parallel on the surface of the substrate and extended from the first side to the second side of the substrate, each conductive line including a conductive trace having a first edge and a second edge opposite to the first edge, and a plurality of triangle sensing electrodes arranged at the two edges of the conductive trace, each triangle sensing electrode having a symmetry axis and being connected with the conductive trace via a conductive line extended from the triangle sensing electrode to a conductive trace, wherein the conductive line is extended along the symmetry axis of the triangle sensing electrode and has a width smaller than any of side lengths of the triangle sensing electrode, each conductive line only having one connection end close to the second side; and a touch detection circuit electrically connected to the connection ends of the plurality of conductive lines through a connection circuit, so as to detect variations of the equivalent resistances and the equivalent capacitances of the plurality of conductive lines, thereby determining at least one touch position on the substrate, wherein
    the symmetry axis of one of the plurality of triangle sensing electrodes at the first edge of the conductive trace of an i-th conductive line is arranged at a position to have a third distance to the symmetry axis of a nearest one of the plurality of triangle sensing electrodes at the second edge thereof, and the symmetry axes of two adjacent triangle sensing electrodes at the first edge are arranged to have a fourth distance therebetween, where the fourth distance is twice of the third distance, where i is a positive integer,
    the plurality of triangle sensing electrodes at the first edge of the conductive trace of the i-th conductive line are disposed at positions aligned with those of the plurality of triangle sensing electrodes at the first edge of the conductive trace of the (i+1)-th conductive line, respectively, the plurality of triangle sensing electrodes at the second edge of the conductive trace of the i-th conductive line are disposed at positions aligned with the positions of the plurality of triangle sensing electrodes at the second edge of the conductive trace of the (i+1)-th conductive line, respectively.

\* \* \* \* \*